(12) United States Patent
Chang

(10) Patent No.: US 7,635,796 B2
(45) Date of Patent: Dec. 22, 2009

(54) METHOD FOR REMOVING HEAVY METALS FROM INCINERATOR FLY ASHES

(76) Inventor: Kuen-Sen Chang, 4F, 21 Nan-Pin, 1st Street, 402, Tai-Chung (TW)

( * ) Notice: Subject to any disclaimer, the term of this patent is extended or adjusted under 35 U.S.C. 154(b) by 688 days.

(21) Appl. No.: 11/014,825

(22) Filed: Dec. 20, 2004

(65) Prior Publication Data

US 2005/0137444 A1    Jun. 23, 2005

(30) Foreign Application Priority Data

Dec. 23, 2003    (TW) .............................. 92136615 A

(51) Int. Cl.
*B09B 3/00*    (2006.01)
(52) U.S. Cl. ...................... 588/313; 588/412
(58) Field of Classification Search ................. 588/313, 588/412
See application file for complete search history.

(56) References Cited

U.S. PATENT DOCUMENTS 5,196,620 A * 3/1993 Gustin et al. ................. 588/257
5,512,257 A * 4/1996 Frey ............................. 423/98
6,500,395 B1 * 12/2002 Mercier et al. ................. 423/1

FOREIGN PATENT DOCUMENTS

| JP | 2003/080199 | * 3/2003 |
| WO | 97/44500 | * 12/1997 |

* cited by examiner

*Primary Examiner*—Steven Bos

(57) ABSTRACT

A method of removing heavy metals from incinerator fly ashes has the steps of: Determining the type of waste and its treating mode of an incinerator, and determining the outlet(s) and quantities of original fly ash (OFA) and reacted fly ash (RAF) in the incineration facility; Sampling OFA and RFA from their generation positions and detecting properties of OFA and RFA respectively; Calculating heavy metal(s) which exceeds the TCLP standard; Determining an optimal mixing ratio of OFA and RFA for two independent outlets, or the quantity of OFA or RFA that should be added with the convergence of OFA and RFA for one outlet; Extracting heavy metals from the mixed fly ash by a liquid to remove the heavy metals.

12 Claims, 2 Drawing Sheets

METHOD FOR REMOVING HEAVY METALS FROM INCINERATOR FLY ASHES

BACKGROUND OF THE INVENTION

1. Field of the Invention

The present invention relates generally to a method of treating industrial waste and hazardous waste, and more particularly to a method of removing heavy metals from incinerator fly ashes.

2. Description of the Related Art 15-25% ashes are derived from the waste incinerator and the ashes are divided into bottom ash and fly ash. Bottom ash contains ceramics, glass, iron, aluminum, pure ash etc., and usually meets the criteria of Toxicity Characteristics Leaching Procedure (TCLP), thus normally classified as a nonhazardous solid waste. On the contrary, fly ash contains heavy metals, such as Cd and Pb, which usually fail in TCLP test and ordinarily classified as a hazardous waste. According to the relative laws, fly ash cannot be mixed with bottom ash and must be treated prior to disposal. The conventional treatments of hazardous fly ash include solidification, stabilization, encapsulation and thermal treatment. Besides, some new methods including synthetic zeolite treatment and fluidizing electrolysis treatment for incinerator fly ash are developing. Conventional treatments for fly ash are described in brief as follows:

1. Solidification treatment: Hazardous waste is mixed with cement, pozzolanic material or other chemical fixing agent to solidify the waste, and to prevent the hazardous materials of the waste from leaching. A common fixing agent used in the solidification of incinerator fly ash is cement. Cement solidification treatment is easily operated, but it generates larger size of solidified material which will not be able to recycle and need to be monitored in an independent landfill site.

2. Stabilization treatment: Hazardous waste is added with chemical stabling agent for reaction and transformed to be a stable and nonpoisonous material. The conventional stabling agents include epoxy, urea formaldehyde, polyurethane, polyester, asphalt and other chemical compounds.

3. Encapsulation treatment: Hazardous waste is encased into a suitable case as in a capsule for isolation. Since the cost of this treatment is high, so encapsulation is not suitable for fly ash but for special wastes, like nuclear waste.

4. Thermal treatment: Inorganic hazardous waste is heated to a temperature over 1,200° C. and forms a ceramic-like or glass-like material. The cost of thermal treatment of incinerator fly ash is high comparing with those of other treatments. Recently, some researchers are looking for a possibility of mixing incinerator fly ash with waste irons in an electric arc furnace (EAF), but it is found that heavy metal in fly ash is more accumulated.

This patent inventor had done many research for the removal of heavy metals in incinerator fly ashes. According to the generation place, fly ashes are classified as "original fly ashes (OFA)" and "reacted fly ash (RFA)." OFA was generated at boiler, cyclone, and economizer. RFA was generated at semi-scrubber and baghouse. The patent inventor's research is described in brief as follows:

1. Acid flushing: Two MSW incinerators fly ashes were packed into column and flushed by hydrochloric acid (pH=2). The flushed OFA was then tested by TCLP and observed that the removals of Cd, Pb and Zn were 82%, 40% and 56% respectively, but all couldn't met the TCLP standard. Nevertheless, the removal of Pb in RFA was 89% that passed the TCLP test.

2. Ultrasonic extraction: Two incinerator fly ashes were sampled and treated by ultrasound. The removals of Cd, Pb and Zn in OFA were 31%, 25% and 11% respectively, but all exceeded the TCLP criteria. The removal of Pd in RAF was 89% that passed the TCLP criteria.

3. Electrokinetic treatment: Fly ash has high alkalinity so that much power is needed in the electrokinetic treatment. According to a constant 50 V, 7 days electrokinetic treatment for incinerator fly ash, electricity consumption was estimated about 5,700-7,000 kWh/ton. It means that electrokinetic treatment is too expensive to be used.

4. Acid extraction: MSW incinerator fly ashes were extracted by acid solutions which including hydrochloric acid, nitric acid, sulfuric acid, citric acid and electrolytic acid. The concentrations of acid solutions were 0.1, 0.01, and 0.005 M. After a twenty-four hour shaking extraction, the removals of Cd and Zn were in a range of 60-90% and the removal of Pb was 7-71%. It was found that increasing the concentration of acid solution will increase the removal of Cd and Zn except Pb.

5. Non-acid extraction: MSW incinerator fly ashes were extracted by EDTA, SDS and distilled water (DW). The concentrations of non-acid agents are 0.1, 0.01, and 0.005 M. The results suggested that the removals of Cd and Zn were in a range of 88-100%, and Pb was 2-77%. The higher concentration of non-acid solution has the greater removal of heavy metal, except the 0.1 M EDTA sample.

6. Sequential extraction (DW, sulfuric acid, ultrasound): MSW fly ashes were first extracted by distill water, and then extracted by sulfuric acid. The results shown that: (1) OFA: The removal of Cd in TCLP was 6-30%, but total content of Cd wasn't change significantly. On the contrary, the removal of total content of Zn was 39-47%, but the concentration of Zn in TCLP increased. (2) RFA: The removal of Pb in TCLP was 58-70%, and was 26-30% in total content. Such sequential extraction samples were further treated by an ultrasound-assisted extraction for ten minutes. The results indicated that: (1) OFA: The removal of Cd didn't change much in both of TCLP and total content, and the concentration of Zn in TCLP also increased. (2) RFA: The removals of Pb in TLCP and total content were 59-74% and 25-39% respectively, which hinted that ultrasound could improve the removal performance.

7. Sequential extraction (DW, sulfuric acid, centrifugation): MSW fly ashes were sequential extracted by DW and sulfuric acid, and then the samples were centrifugal separated in 2,500, 5,000 and 10,000 rpm for 5 and 10 minutes. It was found that centrifugation benefits the removal of heavy metals from fly ashes.

8. Sequential extraction (DW, microwave): MSW fly ashes were continuously extracted by DW for three times to release electrolytes. The results implied that: (1) OFA: Cd in TCLP was removed 31-78%, which met the TCLP criteria. Besides, Cd and Zn in total content were removed 22-29% and 43-51% respectively, but the removal of Zn in TCLP was unstable. (2) RFA: The removals of Pb in TCLP and total content were 53-58% and 19-26% respectively. Samples were further treated by a 2,450 MHz/500 W microwave oven for 5-30 minutes. The results shown that: (1) OFA: The removal of Cd in TCLP was 26-60%, and Zn in TCLP was worse than before. The removals of Cd and Zn in total content were 6-36% and 39-59% respectively. (2) RFA: The removal of Pb in TCLP was 65-80%; in total content was 34-67%. It indicated that microwave-assisted treatment could increase the metal removal.

9. Extraction by SDS, $Fe(NO_3)_3$ and artificial $Fe(NO_3)_3$: MSW incinerator fly ashes were extracted by a critical micelle concentration (CMC) of SDS, $Fe(NO_3)_3$ and artificial $Fe(NO_3)_3$. The concentrations of $Fe(NO_3)_3$ and artificial $Fe(NO_3)_3$ were 0.1, 0.01 and 0.005 M. According to the TCLP test, Cd and Pb were decreased but they still exceeded the TCLP criteria. General extraction performance was shown that: SDS>artificial $Fe(NO_3)_3 \geqq Fe(NO_3)_3$, and $Fe^{3+}$ and the agent concentration didn't affect obviously on the removal (or displacement) of heavy metals.

10. Sequential extraction by ultrasound: MSW incinerator fly ashes were mixed with DW and settled for a day, and then treated by an ultrasound-assisted extraction for five minutes. After seven cycles, the results suggested that: (1) OFA: The removals of Cd in TCLP and Zn in total content were observed, but Zn was fail in TCLP. (2) RFA: The concentrations of Pb passed TCLP criteria in the first and second cycles.

In conclusion, the inventor had tried many methods for removing heavy metals from MSW incinerator fly ashes. Such methods can be classified as: (1) flushing, (2) ultrasound-assisted extraction, (3) electrokinetic treatment, (4) shaking extraction by acids (hydrochloric acid, nitric acid, sulfuric acid, citric acid, and electrolytic acid) and non-acid solutions (EDTA, SDS, DW, $Fe(NO_3)_3$, and artificial $Fe(NO_3)_3$), (5) centrifugal separation, and (6) microwave-assisted extraction. Even each of those methods had got a certain performance in one or two metal removal, but none of them could pass all metals in TCLP criteria.

SUMMARY OF THE INVENTION

The primary objective of the present invention is to provide an innovative method of removing heavy metals from incinerator fly ashes. In this method, the operation procedure is simple, and the performance for metal removal in TCLP and total content is quite good and meets all criteria of relative laws.

According to the objective of the present invention, a method of the present invention comprises the steps of:

a) Determining the waste type and incineration mode of an incinerator, and determining the quantities of OFA and RFA in their outlets (or generation places);

b) Sampling OFA and RFA from its outlet (or place), and detecting properties of OFA and RFA respectively;

c) Calculating the concentration of heavy metal in TCLP for OFA and RFA, and determining which metal exceeds TCLP standard;

d) Determining an optimal ratio of mixing for OFA and RFA to get a mixed fly ash, and e) Extracting heavy metals from the mixed fly ash by a liquid.

DETAILED DESCRIPTION OF THE INVENTION

Figure 1:
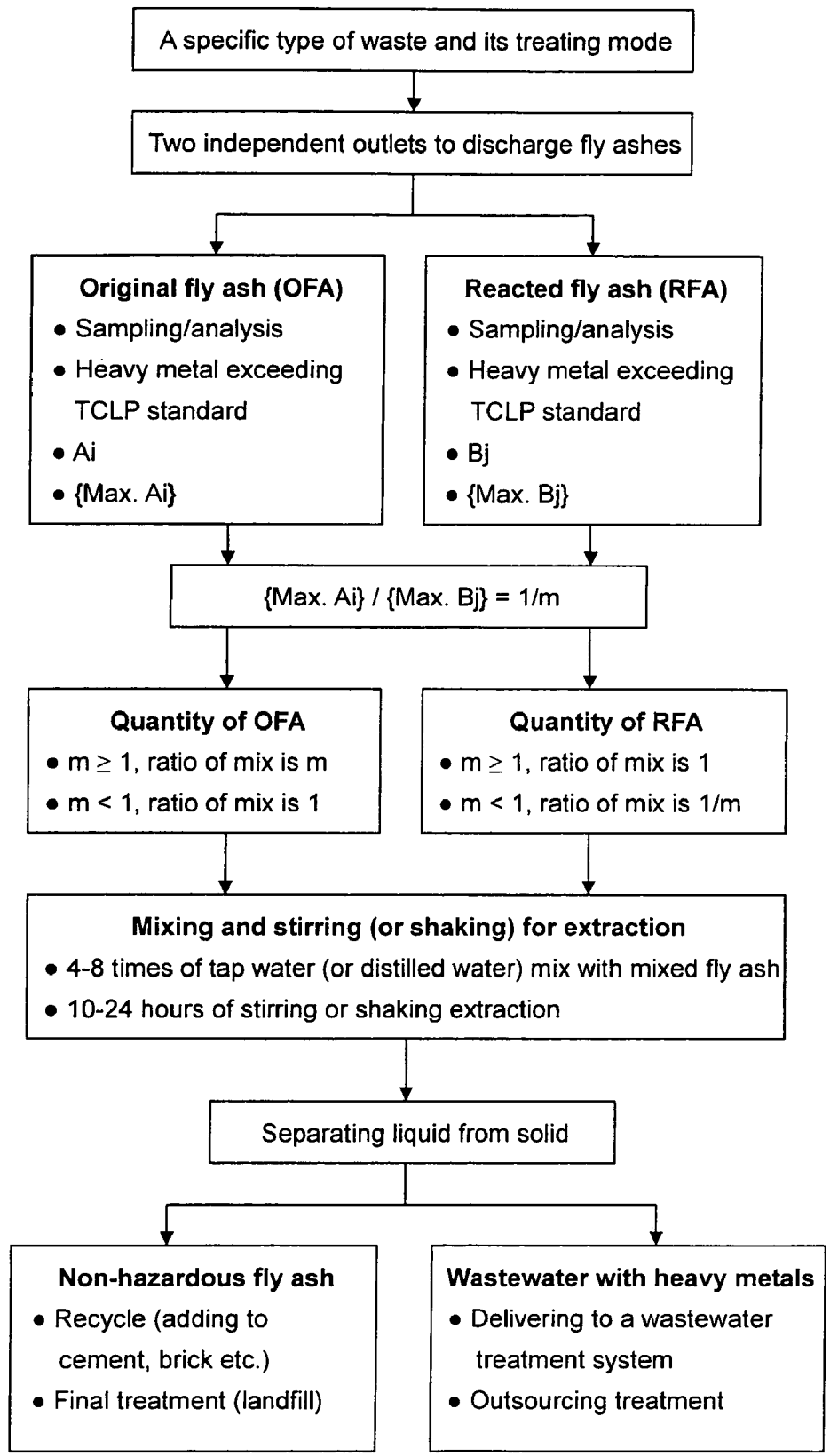
FIG. 1 is a flow chart of a first preferred embodiment of the present invention.

As shown in FIG. 1, a method of the preferred embodiment of the present invention comprises the steps of:

a) Determining the waste type and incineration mode of an incinerator, which means we should make sure what kind of the waste is treated and what incineration mode is operated. While the incinerator has same type of waste and same treating mode, this invention can be performed by the following steps. That is, waste type and incineration mode will affect the properties of fly ashes. In order to get the best performance, each waste type with its treating mode must have its optimal mixing method by the following steps.

b) Determining the outlets of OFA and RFA in the incineration facility. There are two types of outlet for discharging fly ashes: (1) Two independent outlets: One outlet is equipped for discharging "original fly ash (OFA)" from boiler, economizer, and cyclone, in which no material is added. Another outlet is equipped for discharging "reacted fly ash (RFA)" from semi-dry scrubber and baghouse (or electroprecipitator), in which lime or/and activated carbon are added. (2) One independent outlet: OFA is conveyed to mix with RFA and discharges together. The following steps are suitable for two independent outlets; one independent outlet should follow another procedure which described in the second preferred embodiment of the present invention.

c) Sampling the fly ashes from the outlets and detecting properties of fly ashes, such as pH value, heavy metals in TCLP and total content.

d) Picking heavy metal(s) which exceeds the TCLP standard, and calculating a mixing ratio according to the rules described hereunder:

1) Original fly ash (OFA): Assuming that there are i item(s) of heavy metal(s) exceeds TCLP standard, then
[Heavy metal concentration in TCLP (mg/L)]÷[TCLP standard value (mg/L)]=Ai
Picking the maximum value of Ai, i.e., {Max. Ai}

2) Reacted fly ash (RFA): Assuming that there are j item(s) of heavy metal(s) exceed TCLP standard, then
[Heavy metal concentration in TCLP (mg/L)]÷[TCLP standard value (mg/L)]=Bj
Picking the maximum value of Bj, i.e., {Max. Bj}

3) Calculating the ratio of {Max. Ai} and {Max. Bj}.
[{Max. Ai} of OFA]÷[{Max. Bj} of RFA]=1/m 4) Calculating the optimal ratio of mixing OFA and RFA.
If $m \geqq 1$, then the ratio of OFA and RFA is m:1, and
If m<1, then the ratio of OFA and RFA is 1:1/m.

e) Mixing OFA and RFA to have a mixed fly ash according to the ratio calculated by the former step.

f) Mixing the mixed fly ash with neutral tap water (or distilled water) to have a mixture, in which the weight of the water is 4-8 times that of the mixed fly ash, and then stirring or shaking the mixture.

g) Separating solid parts and liquid parts of the mixture by pressure filter, vacuum filter or centrifugal filter to get treated fly ash and wastewater respectively. The treated fly ash will not only pass TCLP test but also become a non-hazardous material, thus it can be mixed as a part of cement, brick, and ceramics etc., or disposed in landfill. The wastewater contains heavy metals, and it should be delivered to the wastewater treatment system prior to discharging.

Figure 2:
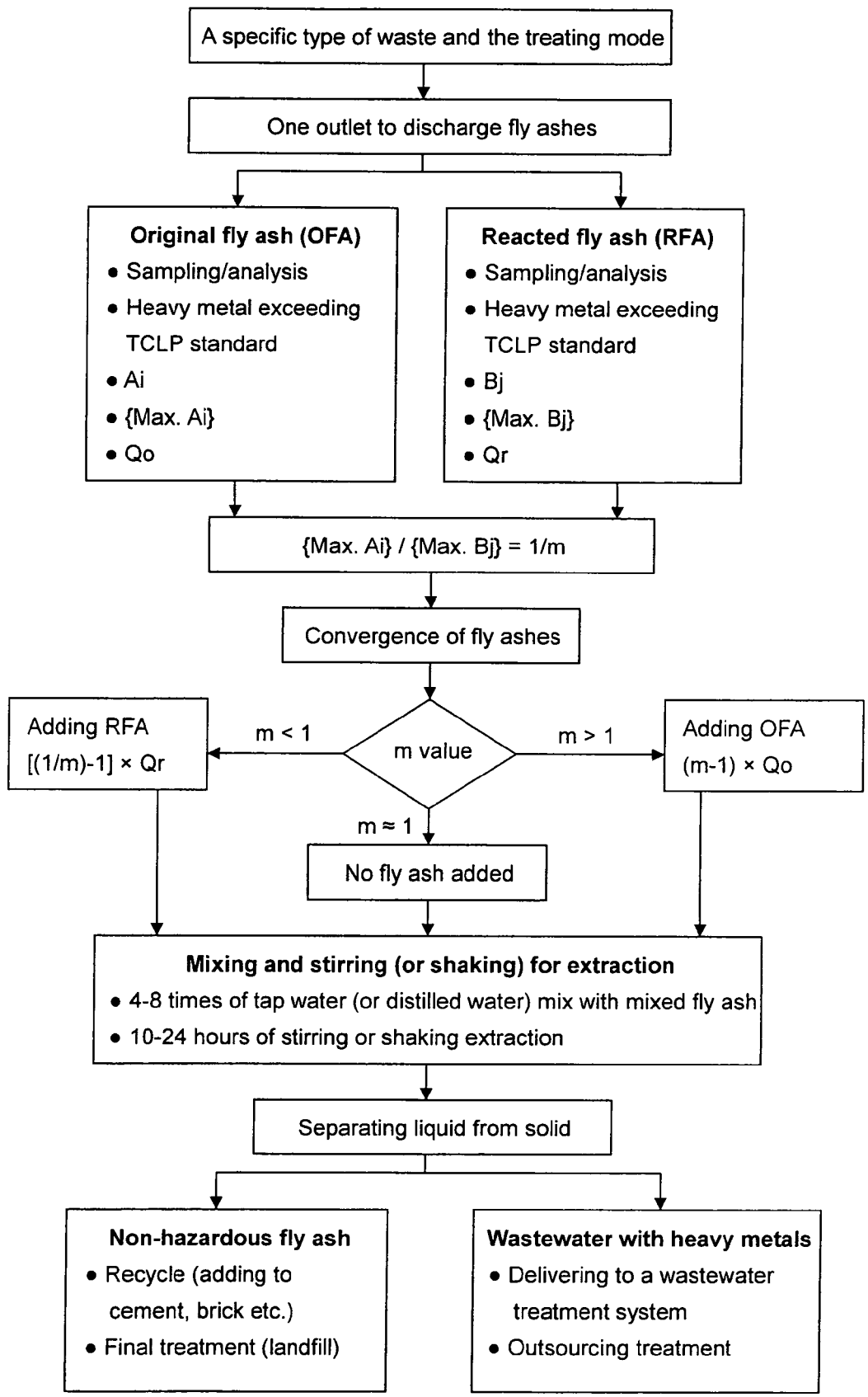
FIG. 2 is a flow chart of a second preferred embodiment of the present invention.

FIG. 2 shows a method of removing heavy metals of the fly ash of the second preferred embodiment of the present invention. This is similar to the method of the first preferred embodiment, except that the incinerator has one independent outlet to discharge both of OFA and RFA. Therefore, under a specific "type of the waste and its treating mode," one should sample OFA and RFA at their generation positions, and identify the daily generation quantity of OFA (Qo) and RFA (Qr). Sample properties, including pH value, heavy metal in TCLP and total content etc., are also needed to be detected. Heavy metal(s) which exceeds the TCLP standard was picked, and we can calculate a mixing ratio according to the rules described below:

1) Original fly ash (OFA): Assuming that there are i item(s) of heavy metal(s) exceed TCLP standard, then

[TCLP concentration of heavy metal (mg/L)]÷[TCLP standard value (mg/L)]=Ai, and

Picking the maximum value of Ai, i.e., {Max. Ai}.

2) Reacted fly ash (RFA): Assuming that there are j item(s) of heavy metal(s) exceeds TCLP standard, then

[Heavy metal concentration in TCLP (mg/L)]÷[TCLP standard value (mg/L)]=Bj

Picking the maximum value of Bj, i.e., {Max. Bj}

3) Calculating the ratio of {Max. Ai} and {Max. Bj}, and

[{Max. Ai} of the original fly ash]÷[{Max. Bj} of the reacted fly ash]=1/m.

4) The convergence of OFA and RFA at the same outlet should be added with OFA or RFA, and the rule is described below:

If m>1, then the convergence fly ash must add with OFA, and the quantity of OFA is (m−1)×Qo;

If m<1, then the convergence fly ash must add with RFA, and the quantity of RFA is [(1/m)−1]×Qr, and If m≈1, then no fly ash has to be added.

In conclusion, the method of the present invention can remove and decrease all the hazardous heavy metals in MSW incinerator fly ashes, and transform hazardous fly ashes into non-hazardous wastes. Moreover, the non-hazardous fly ash doesn't need to be further treated by solidification, and it can be mixed as a part of cement, brick, and ceramics etc., or disposed in landfill site. The present invention is easy operation, low cost and well performance, and it meets the requirements of waste reduction, recycling and can be filed as a patent.

What is claimed is:

1. A method of removing heavy metals from incinerator fly ashes, comprising:
    a) Determining a classification of waste and its treating mode of an incinerator, and determining one or more outlets and quantities of original fly ash (OFA) and reacted fly ash (RAE) in an incineration facility;
    b) Sampling OFA and RFA from their generation positions, and detecting properties of OFA and RFA respectively;
    c) Calculating heavy metal(s) which exceeds the TCLP standard;
    d) Determining an optimal mixing ratio of OFA and RFA for two independent outlets, or a quantity of OFA or RFA that should be added with a convergence of OFA and RFA for one outlet;
    e) Mixing the OFA and the RFA to form a mixed fly ash according to the optimal mixing ratio of step (d): and
    f) Extracting heavy metals from the mixed fly ash by a liquid to remove the heavy metals.

2. The method as defined in claim 1, wherein the classification of waste and its treating mode indicate what kind of the waste is treated in the incinerator and which mode of treatment of the incinerator to treat the waste.

3. The method as defined in claim 1, wherein the incineration facility has two fly ash discharging outlets: One outlet which discharges original fly ash from boiler, economizer, and cyclone, in which no material is added; another outlet which discharges reacted fly ash from semi-dry scrubber or baghouse, in which lime and/or activated carbon are added.

4. The method as defined in claim 1, wherein the incineration facility has only one fly ash discharging outlet: OFA generated from boiler, economizer, and cyclone is conveyed to mix with RFA generated from semi-dry scrubber or baghouse and discharges together at the same outlet.

5. The method as defined in claim 4, wherein a daily generation quantity in a convey system of original fly ash is Qo, and the daily generation quantity of reacted fly ash is Qr.

6. The method as defined in claim 1, wherein the detecting properties for OFA and RFA in step (b) includes pH value, heavy metal concentration of TCLP, and total content of heavy metal.

7. The method as defined in claim 1, wherein step (c) comprises the following sub-steps:
    a) Picking heavy metal(s) which exceeds the TCLP standard and metal concentrations of the heavy metal(s) which exceed the TCLP standard are then divided by a standard value to get Ai for OFA, and Bj for RFA;
    b) Picking maximum values of Ai and Bj respectively, and
    c) Dividing maximum value of Ai by a maximum value of Bj, resulting in a value of 1/m.

8. The method as defined in claim 7, wherein the incineration facility has two independent outlets to discharge OFA and RFA respectively, and the optimal mixing ratio of OFA and RFA is determined by:
    a) If m≧1, then the ratio of OFA and RFA is 1:1/m, and
    b) If m<1, then the ratio of OFA and RFA is 1:1/m.

9. The method as defined in claim 5, wherein the incineration facility has only one outlet to discharge the convergence of OFA and RFA, and the adding quantity of OFA or RFA is determined by:
    a) If m>1, then the convergence fly ash must add with OFA, and the quantity of OFA is(m−1)× Qo;
    b) If m<1, then the convergence fly ash must add with RFA, and the quantity of RFA is [(1/m)−1]× Qr, and
    c) If m=1, then no fly ash has to be added.

10. The method as defined in claim 1, wherein the liquid for extraction in step f is neutral tap water or distilled water.

11. The method as defined in claim 10, wherein a weight of the liquid is 4-8 times greater than that of the mixed fly ash.

12. The method as defined in claim 1, wherein a method of extraction is stirring or shaking for 10-24 hours.

* * * * *